(12) United States Patent
Nishimura

(10) Patent No.: US 7,046,455 B2
(45) Date of Patent: May 16, 2006

(54) VARIABLE MAGNIFICATION LENS AND IMAGING APPARATUS USING THE SAME

(75) Inventor: Kazuya Nishimura, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/993,434

(22) Filed: Nov. 22, 2004

(65) Prior Publication Data

US 2005/0111111 A1 May 26, 2005

(30) Foreign Application Priority Data

Nov. 26, 2003 (JP) .............................. 2003-395392

(51) Int. Cl.
*G02B 15/14* (2006.01)

(52) U.S. Cl. ...................... 359/692; 359/717; 359/740; 359/793; 359/795

(58) Field of Classification Search ................ 359/691, 359/692, 717, 740, 793, 795
See application file for complete search history.

(56) References Cited

U.S. PATENT DOCUMENTS

| | | | | |
|---|---|---|---|---|
| 5,602,676 A * | 2/1997 | Estelle | ........................ | 359/692 |
| 5,642,231 A * | 6/1997 | Estelle | ........................ | 359/692 |
| RE35,775 E * | 4/1998 | Betensky et al. | ........... | 359/692 |
| 5,796,527 A * | 8/1998 | Ohtake | ........................ | 359/692 |
| 6,396,643 B1 * | 5/2002 | Yamanashi | ................... | 359/692 |
| 6,411,443 B1 * | 6/2002 | Kato et al. | ................... | 359/686 |
| 6,701,072 B1 * | 3/2004 | Shirota et al. | ................. | 396/72 |
| 6,707,618 B1 * | 3/2004 | Nishimura | ................... | 359/692 |
| 6,844,987 B1 * | 1/2005 | Endo et al. | ................. | 359/692 |
| 2004/0190156 A1 * | 9/2004 | Kashiki | ....................... | 359/689 |
| 2005/0111111 A1 * | 5/2005 | Nishimura | ................... | 359/692 |

\* cited by examiner

*Primary Examiner*—Evelyn A. Lester
(74) *Attorney, Agent, or Firm*—Kenyon & Kenyon LLP

(57) ABSTRACT

A variable magnification lens includes, in order from the object side, a front lens unit with positive refracting power and a rear lens unit with negative refracting power so that spacing between the front lens unit and the rear lens unit is changed to thereby vary the magnification of the variable magnification lens. In this case, the front lens unit has a negative single lens element with a concave surface facing the object side at the most object-side position and a positive single lens element at the most image-side position. In the front lens unit, only the second lens element from the image side is provided with at least one aspherical surface, and all lens elements included in the front lens unit are constructed as single lens elements arranged through air spacing. An aperture stop is interposed between the front lens unit and the rear lens unit, and the rear lens unit is composed of a negative single lens element. The variable magnification lens satisfies the following condition:

$$1.8 < f_{lt}/f_{lw} < 3.5$$

where $f_{lt}$ is the focal length of the entire system at a telephoto position and $f_{lw}$ is the focal length of the entire system at a wide-angle position.

16 Claims, 10 Drawing Sheets

SPHERICAL ABERRATION
FNO 6.071

ASTIGMATISM
IH=21.63

DISTORTION
IH=21.63

CHROMATIC ABERRATION OF MAGNIFICATION
IH=21.63

SPHERICAL ABERRATION
FNO 8.557

ASTIGMATISM
IH=21.63

DISTORTION
IH=21.63

CHROMATIC ABERRATION OF MAGNIFICATION
IH=21.63

SPHERICAL ABERRATION
FNO 12.054

ASTIGMATISM
IH=21.63

DISTORTION
IH=21.63

CHROMATIC ABERRATION OF MAGNIFICATION
IH=21.63

435.84 — — — —
656.27 - - - - -
587.56 ———

SPHERICAL ABERRATION
FNO 5.128

ASTIGMATISM
IH=21.63

DISTORTION
IH=21.63

CHROMATIC ABERRATION OF MAGNIFICATION
IH=21.63

SPHERICAL ABERRATION
FNO 8.629

ASTIGMATISM
IH=21.63

DISTORTION
IH=21.63

CHROMATIC ABERRATION OF MAGNIFICATION
IH=21.63

SPHERICAL ABERRATION
FNO 12.155

ASTIGMATISM
IH=21.63

DISTORTION
IH=21.63

CHROMATIC ABERRATION OF MAGNIFICATION
IH=21.63

435.84 — — — —
656.27 - - - - - - -
587.56 ———

SPHERICAL ABERRATION
FNO 6.042

ASTIGMATISM
IH=21.63

DISTORTION
IH=21.63

CHROMATIC ABERRATION OF MAGNIFICATION
IH=21.63

SPHERICAL ABERRATION
FNO 8.514

ASTIGMATISM
IH=21.63

DISTORTION
IH=21.63

CHROMATIC ABERRATION OF MAGNIFICATION
IH=21.63

SPHERICAL ABERRATION
FNO 11.985

ASTIGMATISM
IH=21.63

DISTORTION
IH=21.63

CHROMATIC ABERRATION OF MAGNIFICATION
IH=21.63

435.84 – – – – –
656.27 - - - - - - - - -
587.56 ————

SPHERICAL ABERRATION
FNO 6.063

ASTIGMATISM
IH=21.63

DISTORTION
IH=21.63

CHROMATIC ABERRATION OF MAGNIFICATION
IH=21.63

SPHERICAL ABERRATION
FNO 8.547

ASTIGMATISM
IH=21.63

DISTORTION
IH=21.63

CHROMATIC ABERRATION OF MAGNIFICATION
IH=21.63

SPHERICAL ABERRATION
FNO 12.023

ASTIGMATISM
IH=21.63

DISTORTION
IH=21.63

CHROMATIC ABERRATION OF MAGNIFICATION
IH=21.63

435.84 — — — —
656.27 - - - - - -
587.56 ————

VARIABLE MAGNIFICATION LENS AND IMAGING APPARATUS USING THE SAME

The contents of application No. 2003-395392 filed on Nov. 26, 2003, in Japan, are hereby incorporated by reference.

BACKGROUND OF THE INVENTION

1. Field of the Invention

The present invention relates to a variable magnification lens and an imaging apparatus using this variable magnification lens.

2. Description of Related Art

A conventional variable magnification lens has a two-lens-unit arrangement that includes, in order from the object side, a front lens unit with positive power and a rear lens unit with negative power. Such variable magnification lenses, which are simple in lens barrel structure, are often used with respect to low-cost lenses in the main. Many variable magnification lenses in which aspherical lens components are used to reduce the number of lens components are proposed.

In the two-lens-unit arrangements, even the variable magnification lenses with a variable magnification ratio of approximately 2 are often constructed so that a plurality of aspherical lens components are used in the front lens unit, lens components are cemented to each other, or a plurality of lens components are used in the rear lens unit to correct aberration.

In the conventional variable magnification lenses of the two-lens-unit arrangements, both the front and rear lens units sometimes have aspherical lens components. In many of the low-cost optical systems, aspherical lens components are constructed of plastic and are susceptible to the influences of changes of circumstances, such as temperature and humidity. On the other hand, aspherical lens components constructed of glass are little affected by the changes of circumstances.

SUMMARY OF THE INVENTION

The variable magnification lens according to the present invention includes, in order from the object side, a front lens unit with positive refracting power and a rear lens unit with negative refracting power so that spacing between the front lens unit and the rear lens unit is changed to thereby vary the magnification of the variable magnification lens. In this case, the front lens unit has a negative single lens with a concave surface facing the object side at the most object-side position and a positive single lens at the most image-side position. In the front lens unit, only the second lens from the image side is provided with at least one aspherical surface, and all lenses included in the front lens unit are constructed as single lenses arranged through air spacing. An aperture stop is interposed between the front lens unit and the rear lens unit, and the rear lens unit is composed of a negative single lens. The variable magnification lens satisfies the following condition:

$$1.8 < flt/flw < 3.5 \tag{1}$$

where flt is the focal length of the entire system at a telephoto position and flw is the focal length of the entire system at a wide-angle position.

The variable magnification lens according to the present invention preferably satisfies the following condition:

$$1.9 < flt/flw < 3.0 \tag{1-1}$$

In the variable magnification lens according to the present invention, the refracting surfaces of the rear lens unit are preferably configured as only spherical surfaces or only a spherical surface and a flat surface.

In the variable magnification lens according to the present invention, the second lens from the object side and a lens placed behind the second lens satisfy the following condition:

$$50 < vi < 79 \tag{2}$$

where vi is the Abbe's number of the material of the ith ($i \geq 2$) lens from the object side.

The variable magnification lens according to the present invention preferably satisfies the following condition:

$$55 < vi < 72 \tag{2-1}$$

In the variable magnification lens according to the present invention, it is desirable that the lens having the aspherical surface in the front lens unit is constructed of plastic and a remaining lens in the front lens unit is constructed of glass.

In the variable magnification lens according to the present invention, the front lens unit is preferably composed of two lenses: in order from the object side, a lens with negative refracting power, configured of plastic and having the aspherical surface; and a lens with positive refracting power, configured of glass.

The variable magnification lens according to the present invention preferably satisfies the following condition:

$$-1.5 < flt/flasn < -0.3 \tag{3}$$

where flasn is the focal length of the lens having the aspherical surface in the front lens unit constructed with the two lenses.

The variable magnification lens according to the present invention preferably satisfies the following condition:

$$-1.2 < flt/flasn < -0.5 \tag{3-1}$$

In the variable magnification lens according to the present invention, the front lens unit is preferably composed of three lenses: in order from the object side, a lens with negative refracting power, configured of glass; a lens with positive refracting power, configured of plastic and having the aspherical surface; and a lens with positive refracting power, configured of glass.

The variable magnification lens according to the present invention preferably satisfies the following condition:

$$0 < flt/flasp < 1.0 \tag{4}$$

where flasp is the focal length of the lens having the aspherical surface in the front lens unit constructed with the three lenses.

The variable magnification lens according to the present invention preferably satisfies the following condition:

$$01 < flt/flasp < 0.8 \tag{4-1}$$

The imaging apparatus according to the present invention includes the variable magnification lens of the present invention mentioned above and an imaging area provided on the image side thereof.

These and other features and advantages of the present invention will become apparent from the following detailed description of the preferred embodiments when taken in conjunction with the accompanying drawings.

BRIEF DESCRIPTION OF THE DRAWINGS

FIGS. 2E, 2F, 2C; and 2H are diagrams showing aberration characteristics at the middle position in infinite focusing of the variable magnification lens in the first embodiment;

DETAILED DESCRIPTION OF THE PREFERRED EMBODIMENTS

Figure 1A:
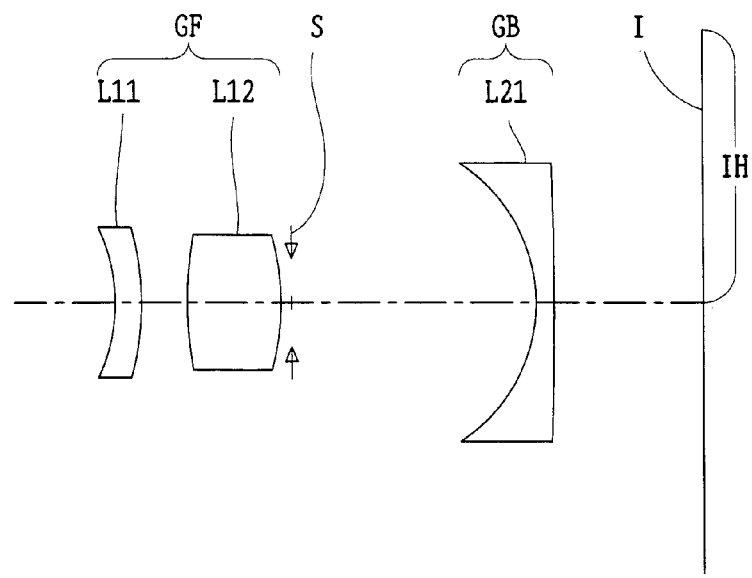
FIGS. 1A and 1B are sectional views showing optical arrangements, developed along the optical axis, at wide-angle and telephoto positions, respectively, of a first embodiment of the variable magnification lens according to the present invention.

Before undertaking the description of the embodiments, the function and effect of the present invention will be explained.

In the variable magnification lens that includes, in order from the object side, a front lens with positive refracting power and a rear lens unit with negative refracting power so that spacing between the front lens unit and the rear lens unit is changed to thereby vary the magnification as in the variable magnification lens of the present invention, when a negative lens with a concave surface facing the object side is placed at the most object-side position of the front lens unit, distortion is corrected, the outer diameters of individual lenses in the front lens unit can be diminished, and a reduction of material cost and a lightweight design can be achieved. The stop is interposed between the front and rear lens units and thereby the structure of a lens barrel can be simplified. When the rear lens unit is constructed with a single lens, the spacing between the front and rear lens units is increased, and the simplification of a lens barrel mechanism and lens assembly and fabrication are facilitated.

When aspherical surfaces in the front lens unit are collected at a single lens alone, it becomes easy to reduce manufacturing cost and to ensure the axial symmetry of a lens surface, notably on assembly. The influence of the degradation of image quality caused by the relative decentration of lenses in the lens unit is easily suppressed.

According to the variable magnification lens of the present invention, therefore, the front lens unit ensuring optical performance while keeping down the cost can be easily fabricated. When the aspherical surfaces collected at the single lens are provided at the second lens from the image side of the front lens unit, the effect of an aspherical lens on correction for aberration can be ensured in the range from axial aberration to off-axis aberration. This is advantageous for the improvement of the performance level of the entire optical system.

Condition (1) determines a favorable, variable magnification ratio where the above lens arrangement is adopted in the variable magnification lens of the present invention.

Below the lower limit of Condition (1), aberration can be corrected even though the aspherical surfaces are not used, but a change of the angle of view becomes slight and an adaptive limit of the variable magnification lens of the present invention is narrowed.

Beyond the upper limit of Condition (1), it becomes hard to make correction for aberration unless the number of lenses is increased or many aspherical surfaces are used in the rear lens unit. Thus, it becomes difficult to hold the balance between low cost and correction for aberration.

In the variable magnification lens of the present invention, it is more desirable to satisfy Condition (1-1) instead of Condition (1).

Condition (1-1) determines the variable magnification ratio that is more suitable for the performance of the variable magnification lens of the present invention.

Also, in Condition (1), only the lower limit, or the upper limit of Condition (1-1) may be set. Further, in Condition (1), the lower limit may be set to 1.95 or the upper limit may be set to 2.6.

In the variable magnification lens of the present invention, it is desirable that the refracting surfaces of the rear lens unit are configured as only spherical surfaces or only a spherical surface and a flat surface.

When the aspherical lens is placed in the rear lens unit, it has an effect on correction for off-axis aberration, but in order to obtain a lens having a symmetry axis common to both surfaces, fabrication accuracy is required. However, when the refracting surfaces of the rear lens unit are configured as only spherical surfaces or only a spherical surface and a flat surface, the symmetry axis common to both surfaces can be easily ensured and the guarantee of the optical performance of the entire system is facilitated.

In the variable magnification lens of the present invention, it is desirable that the second lens from the object side and a lens placed behind the second lens satisfy Condition (2).

Condition (2) is provided to hold the balance between manufacturing cost and chromatic aberration.

If the upper limit of Condition (2) is exceeded and the second lens from the object side and a lens placed behind the second lens have low dispersion, their materials will be raised in cost or will become so soft that fabrication is difficult.

If the lower limit of Condition (2) is passed and the second lens from the object side and a lens placed behind the second lens have high dispersion, correction for chromatic aberration will become difficult.

In the variable magnification lens of the present invention, it is more desirable to satisfy Condition (2-1) instead of Condition (2).

When Condition (2-1) is satisfied, it becomes easy to favorably hold the balance between cost and correction for chromatic aberration where the variable magnification lens of the present invention is constructed as mentioned above.

Also, in Condition (2), only the lower limit or the upper limit of Condition (2-1) may be set. Further, in Condition (2), the lower limit may be set to 57 or the upper limit may be set to 66.

In the variable magnification lens of the present invention, it is desirable that the lens having the aspherical surface in the front lens unit is constructed of plastic, and the remaining lens in the front lens unit is constructed of glass.

When only one aspherical lens in the front lens unit is configured as a plastic lens that is easy in fabrication and the remaining lens is configured as a glass lens, the manufacturing cost is kept down and influences of temperature and humidity changes on these lenses can be lessened.

In the variable magnification lens of the present invention, it is desirable that the front lens unit is constructed with two lenses: in order from the object side, a lens with negative refracting power, configured of plastic and having the aspherical surface; and a lens with positive refracting power, configured of glass.

In the variable magnification lens including the front lens unit with positive power and the rear lens unit with negative power, when a negative lens having the aspherical surface is placed at the most object-side position, various aberrations can be corrected in good balance. Thus, when a lens with positive refracting power subsequent to the negative aspherical lens is configured as a single glass lens, the degradation of performance due to temperature and humidity changes is suppressed and the number of lenses can be reduced. This further facilitates the fabrication.

In the variable magnification lens of the present invention, it is desirable to satisfy Condition (3).

Condition (3) is provided to determine the refracting power of the plastic aspherical lens located at the most object-side position.

Below the lower limit of Condition (3), axial chromatic aberration is liable to occur and it becomes difficult to correct the aberration with a simple lens arrangement.

Beyond the upper limit of Condition (3), there is a tendency that the shift of the imaging position caused by changes of circumstances becomes considerable.

In the variable magnification lens of the present invention, it is desirable to satisfy Condition (3-1) instead of Condition (3).

When Condition (3-1) is satisfied, good imaging performance is easily obtained in the lens arrangement mentioned above.

Also, in Condition (3), only the lower limit or the upper limit of Condition (3-1) may be set. Further, in Condition (3), the lower limit may be set to −1.0 or the upper limit may be set to −0.8.

In the variable magnification lens of the present invention, it is desirable that the front lens unit is constructed with three lenses: in order from the object side, a lens with negative refracting power, configured of glass; a lens with positive refracting power, configured of plastic and having the aspherical surface; and a lens with positive refracting power, configured of glass.

When the lens located at the most object-side position is configured as the negative lens, power can be symmetrically distributed in the entire optical system. This is advantageous for correction for distortion. On the other hand, the surface of the plastic lens is liable to damage, and thus it is desirable that a first lens coming in direct contact with the air is configured as a glass lens. When the first lens is configured as the glass lens, a moderate refracting power can be imposed on the lens, which is advantageous for correction for chromatic aberration in the front lens unit. On the other hand, when the aspherical lens is constructed of glass material, the manufacturing cost is raised. Therefore, when a second lens subsequent to the negative glass lens is configured as a plastic aspherical lens, correction for aberration due to the aspherical surface and influences of temperature and humidity changes can be easily balanced without raising the manufacturing cost. If the second lens having the aspherical surface is configured as a lens independent of a third lens that has a main positive refracting power and is made of glass, the influences of temperature and humidity changes can be further lessened. Moreover, if the positive refracting power is imparted to this plastic lens, the plastic lens can be made to function so that the shift of a lens holding frame due to the temperature and humidity changes is canceled by that of the imaging position due to the expansion of the plastic lens.

In the variable magnification lens of the present invention, it is desirable to satisfy Condition (4).

In the variable magnification lens including the front lens unit with positive power and the rear lens unit with negative power, when the negative lens and the positive lens located at the most image-side position in the front lens unit are configured as glass lenses so that correction for chromatic aberration and the refracting power of the front lens unit are ensured by the glass lenses and the refracting power of the plastic lens is set within the limit satisfying Condition (4), the shift of a focus position due to the changes of circumstances can be kept to a minimum in the entire lens barrel.

Beyond the upper limit or below the lower limit of Condition (4), it becomes difficult to hold the balance of the cancel of the influences of changes of circumstances on the lens barrel and the positive lens.

In the variable magnification lens of the present invention, it is desirable to satisfy Condition (4-1) instead of Condition (4).

When Condition (4-1) is satisfied, the degradation of imaging performance due to the changes of circumstances can be obviated.

Also, in Condition (4), only the lower limit or the upper limit of Condition (4-1) may be set. Further, in Condition (4), the lower limit may be set to 0.3 or the upper limit may be set to 0.6. Still further, the lower limit may be set to 0.13.

The imaging apparatus of the present invention includes the variable magnification lens of the present invention mentioned above and an imaging area provided on the image side thereof.

The variable magnification lens of the present invention constructed as described above is suitable for a small-sized film camera provided with a field stop as an element limiting the imaging area. It is also applicable to an electronic imaging apparatus, such as a digital camera, using an image sensor, for example, a CCD or CMOS, as an element with the imaging area.

First Embodiment

Figure 1B:
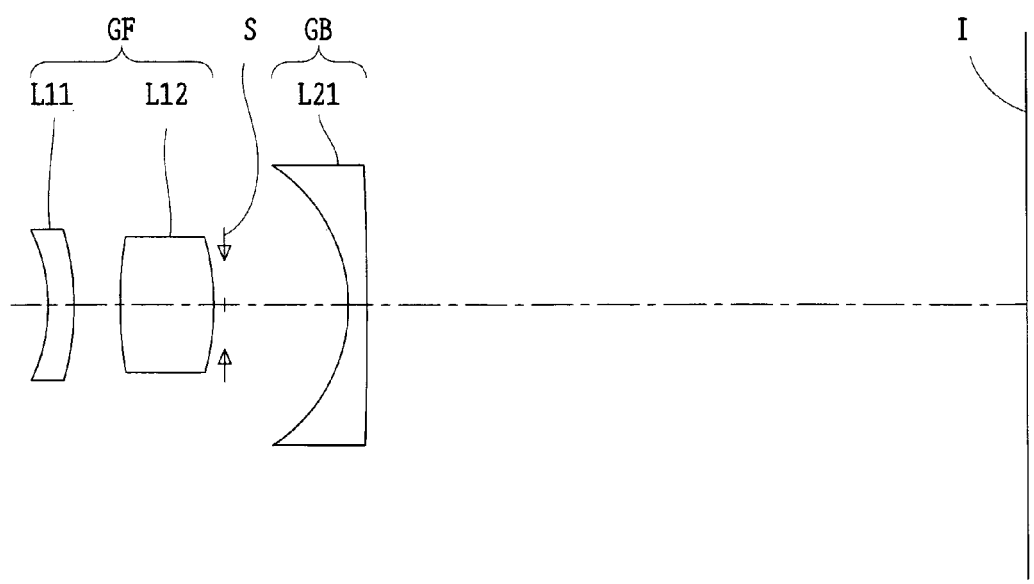
Figure 2A:
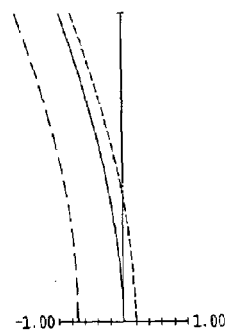
FIGS. 2A, 2B, 2C, and 2D are diagrams showing aberration characteristics at the wide-angle position in infinite focusing of the variable magnification lens in the first embodiment.
Figure 2B:
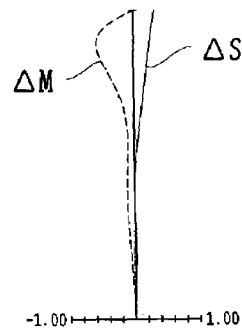
Figure 2C:
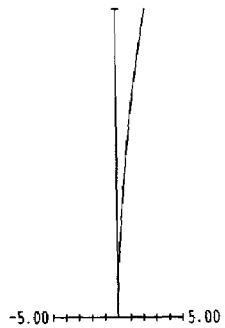
Figure 2D:
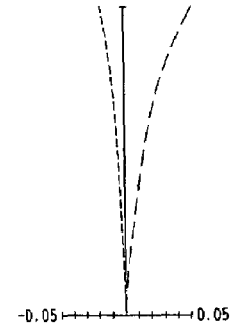
Figure 2E:
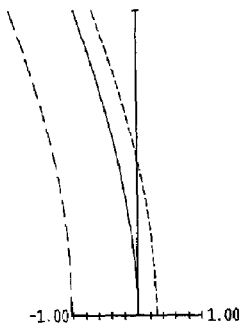
Figure 2F:
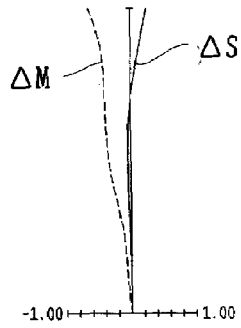
Figure 2G:
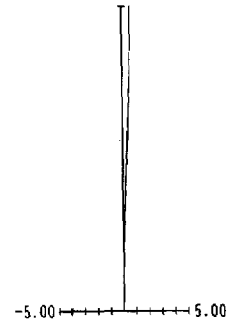
Figure 2H:
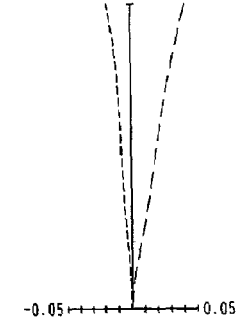
Figure 2I:
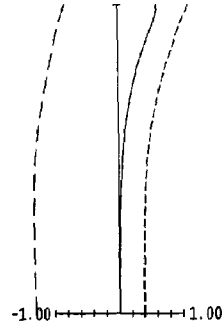
FIGS. 2I, 2J, 2K, and 2L are diagrams showing aberration characteristics at the telephoto position in infinite focusing of the variable magnification lens in the first embodiment.
Figure 2J:
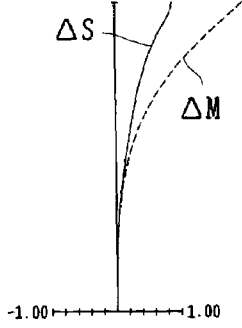
Figure 2K:
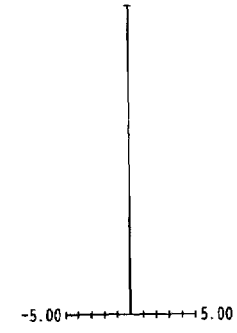
Figure 2L:
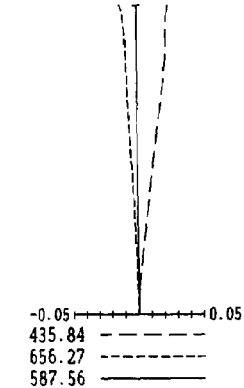

FIGS. 1A and 1B show optical arrangements, developed along the optical axis, at wide-angle and telephoto positions, respectively, of the first embodiment of the variable magnification lens according to the present invention. FIGS. 2A–2L show aberration characteristics in infinite focusing of the variable magnification lens in the first embodiment.

The variable magnification lens of the first embodiment comprises, in order from the object side, a front lens unit GF having positive refracting power as a whole, an aperture stop S, and a rear lens unit GB having negative refracting power as a whole. In FIG. 1A, reference symbol I represents a film surface.

The front lens unit GF includes, in order from the object side, a negative meniscus lens L11 with a concave surface facing the object side and a biconvex lens L12.

The rear lens unit GB is constructed with a negative meniscus lens L21 with a concave surface facing the object side.

When the magnification of the variable magnification lens is changed in the range from the wide-angle position to the telephoto position, the front lens unit GF is moved integrally with the aperture stop S toward the object side, and the rear lens unit GB is moved toward the object side while reducing a distance between the front lens unit GF and the rear lens unit GB.

In the variable magnification lens of the first embodiment, the spherical surfaces are applied to both surfaces of the negative meniscus lens L11 with a concave surface facing the object side.

Any of individual lenses constituting the variable magnification lens of the first embodiment is constructed as a single lens.

Subsequently, numerical data of optical members constituting the variable magnification lens of the first embodiment are shown below.

In the numerical data of the first embodiment, f denotes the focal length of the entire system, Fno denotes an F-number, ω denotes a half angle of view, FB denotes a back focus, and D1 denotes a variable spacing.

Also, when z is taken as the coordinate in the direction of the optical axis, y is taken as the coordinate in a direction perpendicular to the optical axis, K is a conic constant, and $A_4$, $A_6$, $A_8$, and $A_{10}$ are aspherical coefficients, the configuration of the aspherical surface is expressed by the following equation:

$$z=(y^2/r)/[1+\{1-(1+K)(y/r)^2\}^{1/2}]+A_4 y^4+A_6 y^6+A_8 y^8+A_{10}y^{10}$$

These symbols are also used for the numerical data of other embodiments to be described later.

Numerical Data 1

F: 39.0~55.0~77.5 (mm)
Fno: 6.1~8.6~12.1
ω: 28.4~21.3~15.6(°)

| Face number | Radius of curvature | Spacing | Refractive index | Abbe's number | Material |
|---|---|---|---|---|---|
| 1* | −14.50 | 2.00 | 1.58423 | 30.49 | Plastic |
| 2* | −21.50 | 3.67 | | | |
| 3 | 32.13 | 7.53 | 1.51633 | 64.14 | Glass |
| 4 | −17.15 | 0.80 | | | |
| 5 | Stop | D1 | | | |
| 6 | −13.14 | 1.45 | 1.51633 | 64.14 | Glass |
| 7 | −225.29 | FB | | | |

*Aspherical surfaces

Aspherical Coefficients

| Face number | K | $A_4$ | $A_6$ | $A_8$ | $A_{10}$ | $A_{12}$ |
|---|---|---|---|---|---|---|
| 1 | −0.4614 | −6.9742E−05 | 2.1868E−06 | 7.1915E−09 | −1.1036E−10 | −7.7769E−12 |
| 2 | 1.3337 | 3.7265E−06 | 2.3055E−06 | 1.1588E−08 | −1.2266E−09 | 2.3436E−11 |

E-i stands for ×10$^{-i}$

Variable Spacings

| Focal length | 39.0 | 55.0 | 77.5 |
|---|---|---|---|
| D1 | 18.578 | 13.259 | 9.491 |
| FB | 11.960 | 28.367 | 51.446 |

Second Embodiment

Figure 3A:
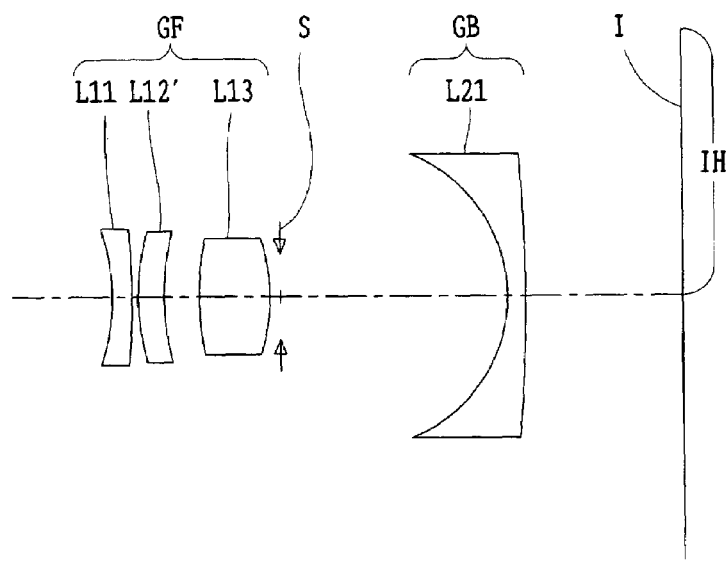
FIGS. 3A and 3B are sectional views showing optical arrangements, developed along the optical axis, at wide-angle and telephoto positions, respectively, of a second embodiment of the variable magnification lens according to the present invention.
Figure 3B:
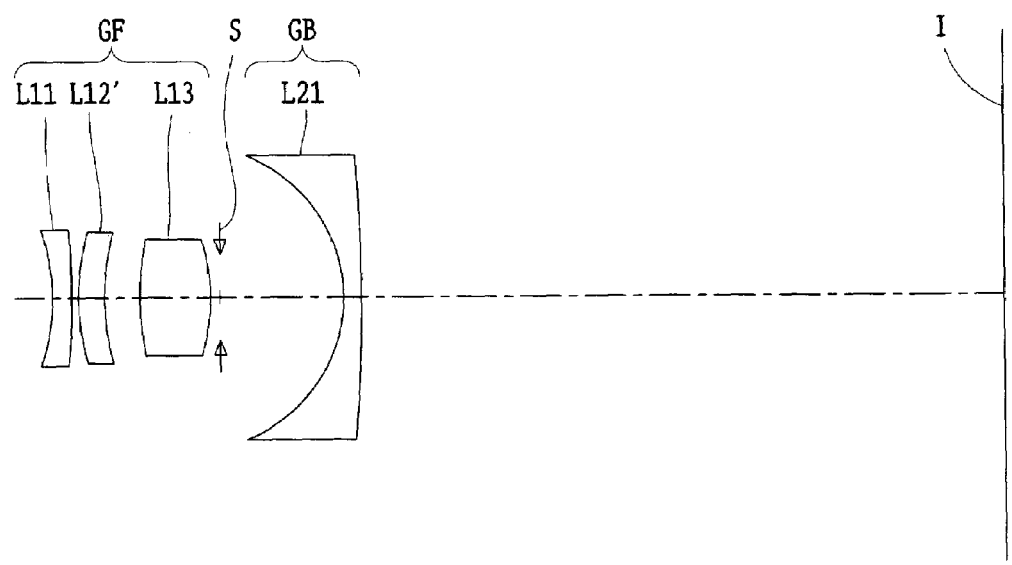
Figure 4A:
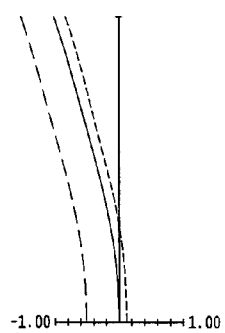
FIGS. 4A, 4B, 4C, and 4D are diagrams showing aberration characteristics at the wide-angle position in infinite focusing of the variable magnification lens in the second embodiment.
Figure 4B:
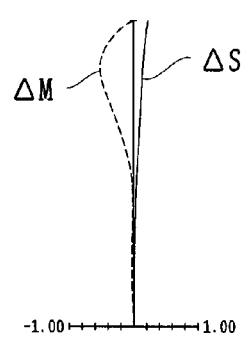
Figure 4C:
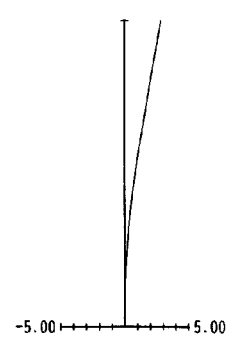
Figure 4D:
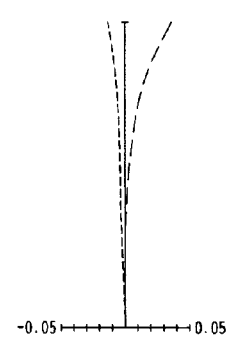
Figure 4E:
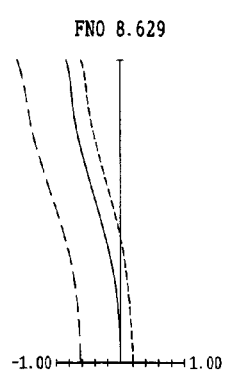
FIGS. 4E, 4F, 4G, and 4H are diagrams showing aberration characteristics at the middle position in infinite focusing of the variable magnification lens in the second embodiment.
Figure 4F:
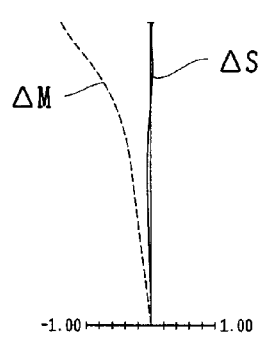
Figure 4G:
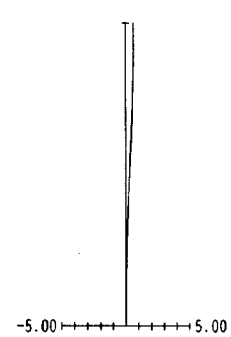
Figure 4H:
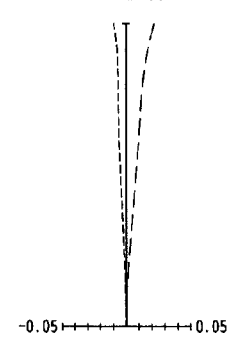
Figure 4I:
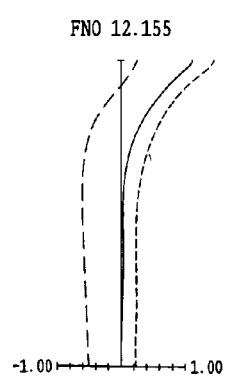
FIGS. 4I, 4J, 4K, and 4L are diagrams showing aberration characteristics at the telephoto position in infinite focusing of the variable magnification lens in the second embodiment.
Figure 4J:
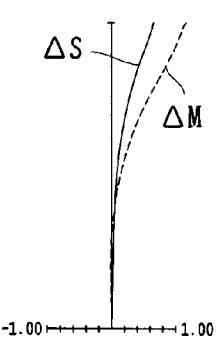
Figure 4K:
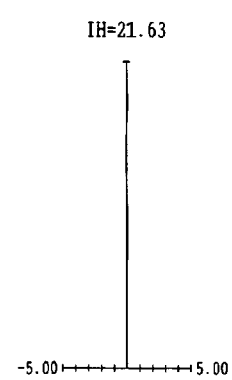
Figure 4L:
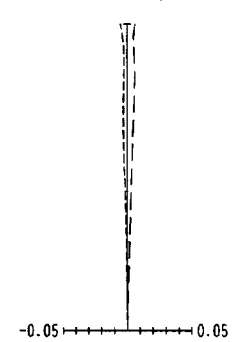

FIGS. 3A and 3B show optical arrangements, developed along the optical axis, at wide-angle and telephoto positions, respectively, of the second embodiment of the variable magnification lens according to the present invention. FIGS. 4A–4L show aberration characteristics in infinite focusing of the variable magnification lens in the second embodiment.

The variable magnification lens of the second embodiment comprises, in order from the object side, the front lens unit GF having positive refracting power as a whole, the aperture stop S, and the rear lens unit GB having negative refracting power as a whole. In FIG. 3A, again reference symbol I represents a film surface.

The front lens unit GF includes, in order from the object side, the negative meniscus lens L11 with a concave surface facing the object side, a positive meniscus lens L 12' with a convex surface facing the object side, and a biconvex lens L13.

The rear lens unit GB is constructed with the negative meniscus lens L21 with a concave surface facing the object side.

When the magnification of the variable magnification lens is changed in the range from the wide-angle position to the telephoto position, the front lens unit GF is moved integrally with the aperture stop S toward the object side, and the rear lens unit GB is moved toward the object side while reducing a distance between the front lens unit GF and the rear lens unit GB.

In the variable magnification lens of the second embodiment, the spherical surfaces are applied to both surfaces of the positive meniscus lens L12' with a convex surface facing the object side.

Any of individual lenses constituting the variable magnification lens of the second embodiment is constructed as a single lens.

Subsequently, numerical data of optical members constituting the variable magnification lens of the second embodiment are shown below.

Numerical Data 2
F: 39.0~55.0~77.5 (mm)
Fno: 6.1~8.6~12.2
ω: 8.3~21.3~15.6(°)

| Face number | Radius of curvature | Spacing | Refractive index | Abbe's number | Material |
|---|---|---|---|---|---|
| 1 | −18.57 | 1.60 | 1.64769 | 33.79 | Glass |
| 2 | −52.70 | 0.50 | | | |
| 3* | 19.22 | 2.10 | 1.49241 | 57.66 | Plastic |
| 4* | 23.007 | 2.77 | | | |
| 5 | 26.31 | 5.69 | 1.51633 | 64.14 | Glass |
| 6 | −15.80 | 0.80 | | | |
| 7 | Stop | D1 | | | |
| 8 | −12.31 | 1.50 | 1.51633 | 64.14 | Glass |
| 9 | −146.55 | FB | | | |

*Aspherical surfaces

Aspherical Coefficients

| Face number | K | $A_4$ | $A_6$ | $A_8$ | $A_{10}$ | $A_{12}$ |
|---|---|---|---|---|---|---|
| 3 | 0.5962 | −2.5204E−05 | −4.1381E−06 | 3.7364E−07 | −9.9985E−09 | 2.7255E−11 |
| 4 | 2.5353 | 3.7754E−05 | −4.5236E−06 | 5.0344E−07 | −1.3867E−08 | 0 |

E−i stands for ×10$^{-i}$

Variable Spacings

| Focal length | 39.0 | 55.0 | 77.5 |
|---|---|---|---|
| D1 | 18.124 | 13.109 | 9.555 |
| FB | 12.316 | 28.492 | 51.259 |

Third Embodiment

Figure 5A:
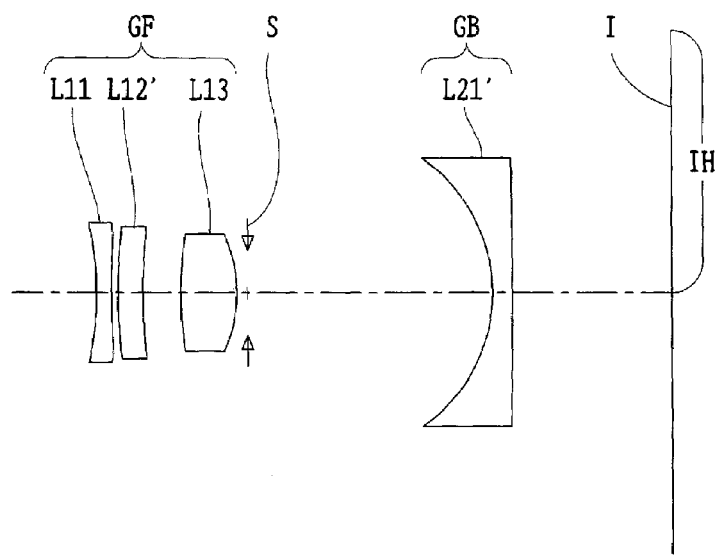
FIGS. 5A and 5B are sectional views showing optical arrangements, developed along the optical axis, at wide-angle and telephoto positions, respectively, of a third embodiment of the variable magnification lens according to the present invention.
Figure 5B:
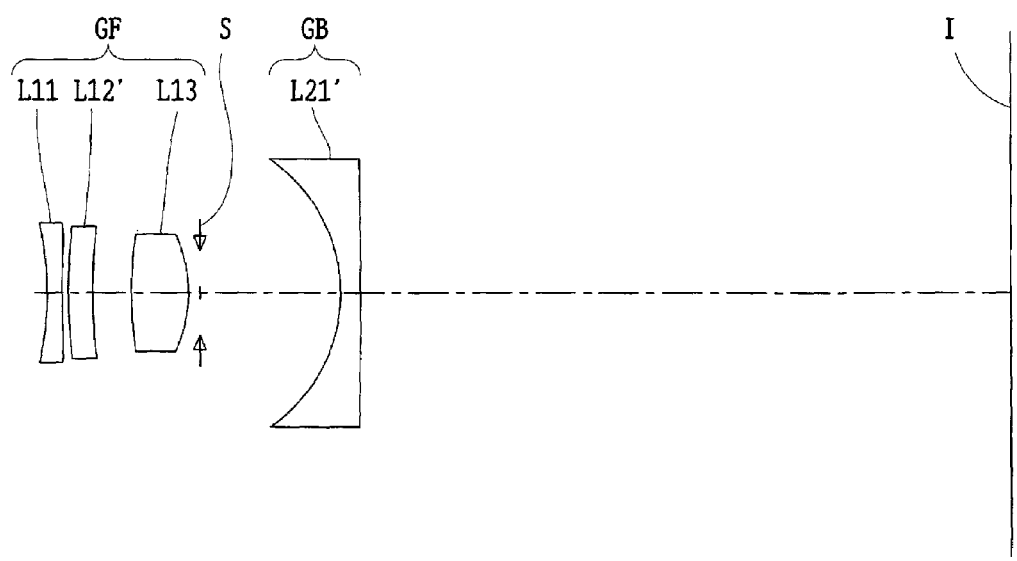
Figure 6A:
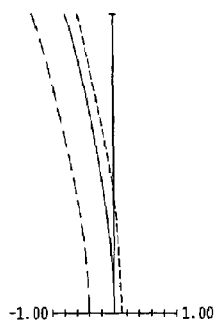
FIGS. 6A, 6B, 6C, and 6D are diagrams showing aberration characteristics at the wide-angle position in infinite focusing of the variable magnification lens in the third embodiment.
Figure 6B:
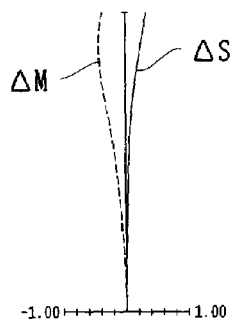
Figure 6C:
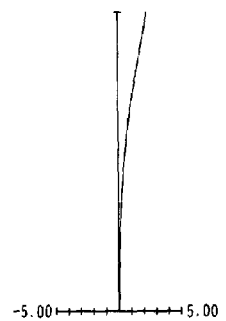
Figure 6D:
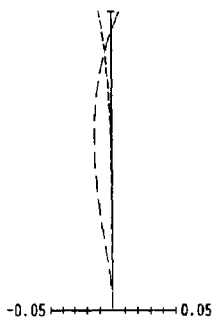
Figure 6E:
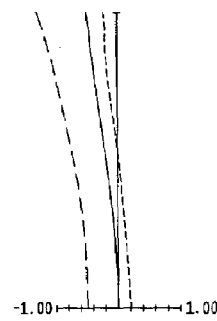
FIGS. 6E, 6F, 6Q and 6H are diagrams showing aberration characteristics at the middle position in infinite focusing of the variable magnification lens in the third embodiment.
Figure 6F:
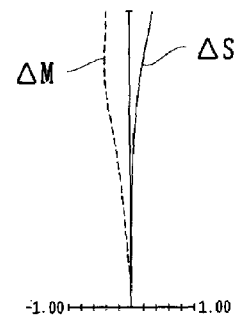
Figure 6G:
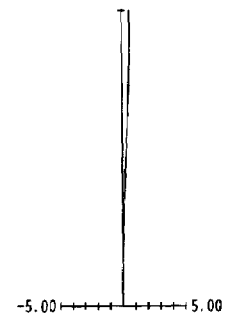
FIGS. 6I, 6J, 6K, and 6L are diagrams showing aberration characteristics at the telephoto position in infinite focusing of the variable magnification lens in the third embodiment.
Figure 6H:
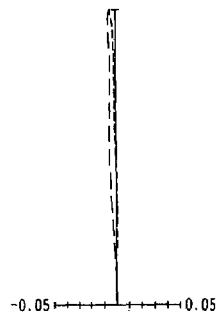
Figure 6I:
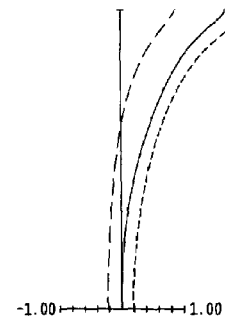
Figure 6J:
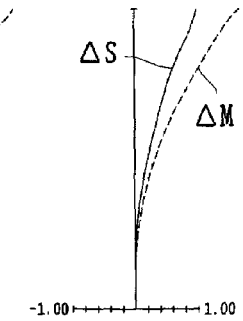
Figure 6K:
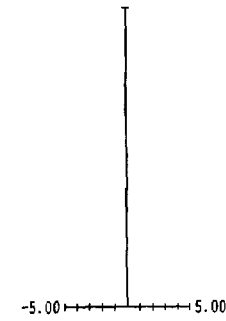
Figure 6L:
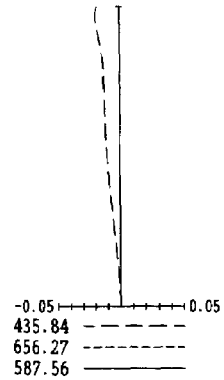

FIGS. 5A and 5B show optical arrangements, developed along the optical axis, at wide-angle and telephoto positions, respectively, of the third embodiment of the variable magnification lens according to the present invention. FIGS. 6A–6L show aberration characteristics in infinite focusing of the variable magnification lens in the third embodiment.

The variable magnification lens of the third embodiment comprises, in order from the object side, the front lens unit GF having positive refracting power as a whole, the aperture stop S, and the rear lens unit GB having negative refracting power as a whole. In FIG. 5A, again reference symbol I represents a film surface.

The front lens unit GF includes, in order from the object side, the negative meniscus lens L11 with a concave surface facing the object side, the positive meniscus lens L12' with a convex surface facing the object side, and the biconvex lens L13.

The rear lens unit GB is constructed with a plano-concave lens L21' with a concave surface facing the object side.

When the magnification of the variable magnification lens is changed in the range from the wide-angle position to the telephoto position, the front lens unit GF is moved integrally with the aperture stop S toward the object side, and the rear lens unit GB is moved toward the object side while reducing a distance between the front lens unit GF and the rear lens unit GB.

In the variable magnification lens of the third embodiment, the spherical surface is applied to the object-side surface of the positive meniscus lens L12' with a convex surface facing the object side.

Any of individual lenses constituting the variable magnification lens of the third embodiment is constructed as a single lens.

Subsequently, numerical data of optical members constituting the variable magnification lens of the third embodiment are shown below.

Numerical Data 3
F: 39.1~55.0~77.5 (mm)
Fno: 6.0~8.5~12.0
ω: 28.4~21.3~15.6(°)

| Face number | Radius of curvature | Spacing | Refractive index | Abbe's number | Material |
|---|---|---|---|---|---|
| 1 | −26.70 | 1.20 | 1.64769 | 33.79 | Glass |
| 2 | 162.35 | 0.50 | 1. | | |
| 3* | 31.03 | 2.00 | 1.49236 | 57.86 | Plastic |

-continued

| Face number | Radius of curvature | Spacing | Refractive index | Abbe's number | Material |
|---|---|---|---|---|---|
| 4 | 44.28 | 3.10 | 1. | | |
| 5 | 43.80 | 4.50 | 1.51633 | 64.14 | Glass |
| 6 | −12.04 | 0.80 | 1. | | |
| 7 | Stop | D1 | 1. | | |
| 8 | −13.63 | 1.50 | 1.51633 | 64.14 | Glass |
| 9 | ∞ | FB | | | |

*Aspherical surface

Aspherical Coefficients

| Face number | K | $A^4$ | $A_6$ | $A_8$ | $A_{10}$ |
|---|---|---|---|---|---|
| 3 | 0 | −1.8349E−04 | −1.3897E−06 | 1.5510E−08 | −1.5067E−09 |

E-i stands for $\times 10^{-i}$

Variable Spacings

| Focal length | 39.0 | 55.0 | 77.5 |
|---|---|---|---|
| D1 | 19.638 | 14.610 | 11.048 |
| FB | 12.846 | 29.296 | 52.407 |

Fourth Embodiment

Figure 7A:
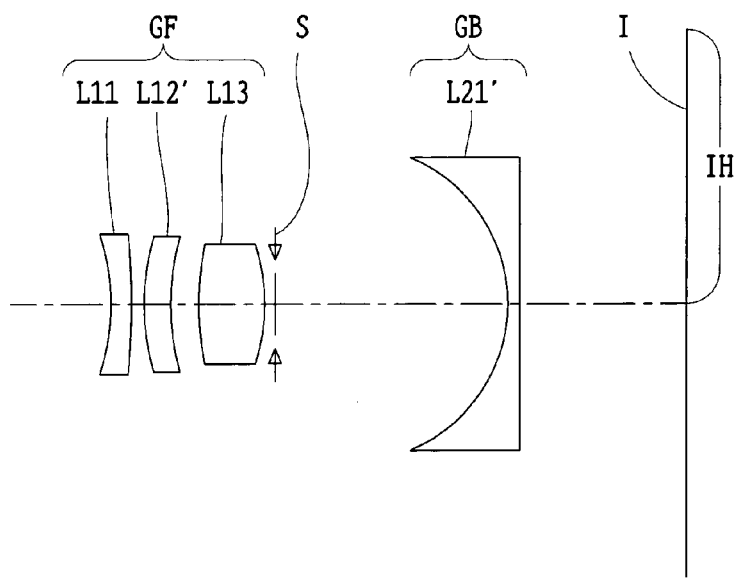
FIGS. 7A and 7B are sectional views showing optical arrangements, developed along the optical axis, at wide-angle and telephoto positions, respectively, of a fourth embodiment of the variable magnification lens according to the present invention.
Figure 7B:
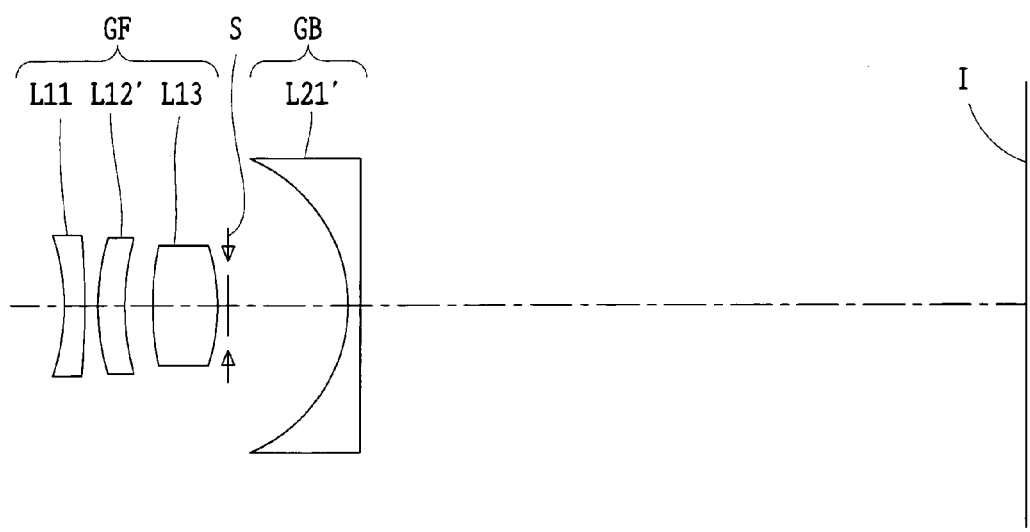
Figure 8A:
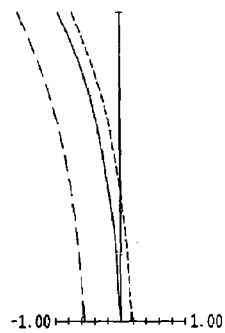
FIGS. 8A, 8B, 8C, and 8D are diagrams showing aberration characteristics at the wide-angle position in infinite focusing of the variable magnification lens in the fourth embodiment.
Figure 8B:
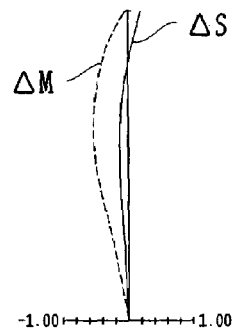
Figure 8C:
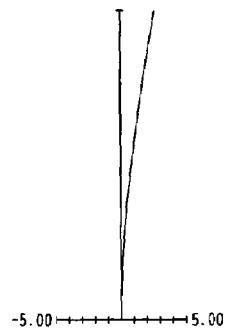
Figure 8D:
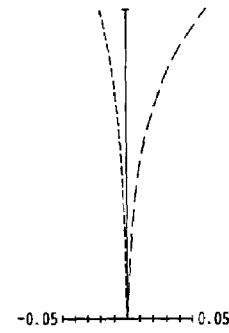
Figure 8E:
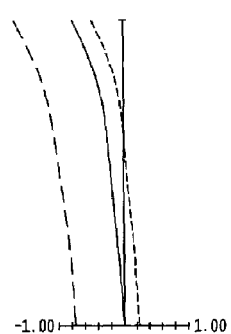
FIGS. 8E, 8F, 8Q and 8H are diagrams showing aberration characteristics at the middle position in infinite focusing of the variable magnification lens in the fourth embodiment.
Figure 8F:
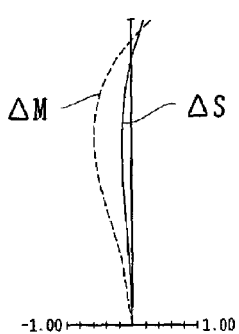
Figure 8G:
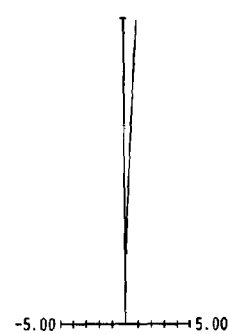
FIGS. 8I, 8J, 8K, and 8L are diagrams showing aberration characteristics at the telephoto position in infinite focusing of the variable magnification lens in the fourth embodiment.
Figure 8H:
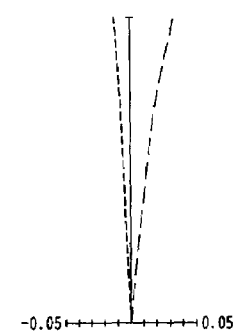
Figure 8I:
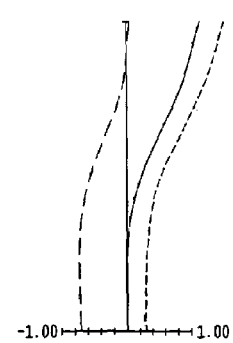
Figure 8J:
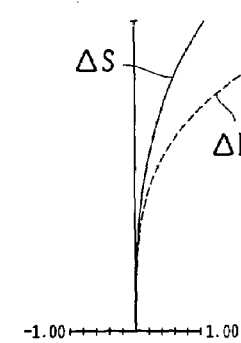
Figure 8K:
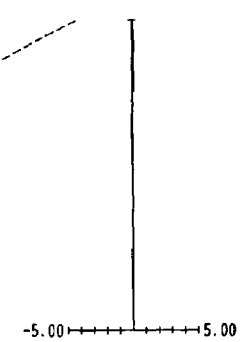
Figure 8L:
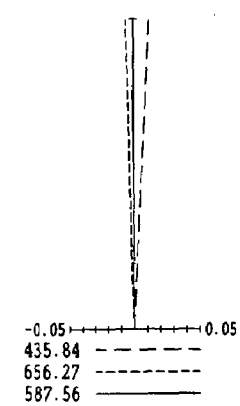

FIGS. 7A and 7B show optical arrangements, developed along the optical axis, at wide-angle and telephoto positions, respectively, of the fourth embodiment of the variable magnification lens according to the present invention. FIGS. 8A–8L show aberration characteristics in infinite focusing of the variable magnification lens in the fourth embodiment.

The variable magnification lens of the fourth embodiment comprises, in order from the object side, the front lens unit GF having positive refracting power as a whole, the aperture stop S, and the rear lens unit GB having negative refracting power as a whole. In FIG. 7A, again reference symbol I represents a film surface.

The front lens unit GF includes, in order from the object side, the negative meniscus lens L11 with a concave surface facing the object side, the positive meniscus lens L12' with a convex surface facing the object side, and the biconvex lens L13.

The rear lens unit GB is constructed with the plano-concave lens L21' with a concave surface facing the object side.

When the magnification of the variable magnification lens is changed in the range from the wide-angle position to the telephoto position, the front lens unit GF is moved integrally with the aperture stop S toward the object side, and the rear lens unit GB is moved toward the object side while reducing a distance between the front lens unit GF and the rear lens unit GB.

In the variable magnification lens of the fourth embodiment, the spherical surface is applied to the image-side surface of the positive meniscus lens L12' with a concave surface facing the object side.

Any of individual lenses constituting the variable magnification lens of the fourth embodiment is constructed as a single lens.

Subsequently, numerical data of optical members constituting the variable magnification lens of the fourth embodiment are shown below.

Numerical Data 4

F: 39.0~55.0~77.4 (mm)

Fno: 6.1~8.5~12.0

ω: 28.4~21.3~15.6(°)

| Face number | Radius of curvature | Spacing | Refractive index | Abbe's number | Material |
|---|---|---|---|---|---|
| 1 | −15.805 | 1.70 | 1.64769 | 33.79 | Glass |
| 2 | −32.936 | 0.90 | | | |
| 3 | 13.168 | 2.00 | 1.49241 | 57.66 | Plastic |
| 4* | 13.226 | 2.39 | | | |
| 5 | 22.990 | 5.15 | 1.51633 | 64.14 | Glass |
| 6 | −15.997 | 0.80 | | | |
| 7 | Stop | D1 | | | |
| 8 | −13.5739 | 1.50 | 1.51633 | 64.14 | Glass |
| 9 | ∞ | FB | | | |

*Aspherical surface

Aspherical Coefficients

| Face number | K | $A^4$ | $A_6$ | $A_8$ | $A_{10}$ |
|---|---|---|---|---|---|
| 4 | 1.2955 | 1.1282E−06 | 2.7204E−06 | −2.8869E−07 | 8.2762E−09 |

E-i stands for $\times 10^{-i}$

Variable Spacings

| Focal length | 39.0 | 55.0 | 77.4 |
|---|---|---|---|
| D1 | 17.145 | 12.164 | 8.648 |
| FB | 13.036 | 29.550 | 52.661 |

Next, values of parameters of conditions in the embodiments are shown below.

| Condition | 1st embodiment | 2nd embodiment | 3rd embodiment | 4th embodiment |
|---|---|---|---|---|
| (1) flt/flw | 1.99 | 1.99 | 1.98 | 1.98 |
| (2) vi | 64.14, 64.14 | 57.66, 64.14, 64.14 | 57.86, 64.14, 64.14 | 57.66, 64.14, 64.14 |
| (3) flt/flasn | −0.91 | — | — | — |
| (4) flt/flasp | — | 0.39 | 0.39 | 0.16 |

Focusing on a near-distance object may be performed by shifting the entire system or only the front lens unit, by moving only the rear lens unit toward the image side, or by moving both lens units while changing the spacing between them.

Figure 9:
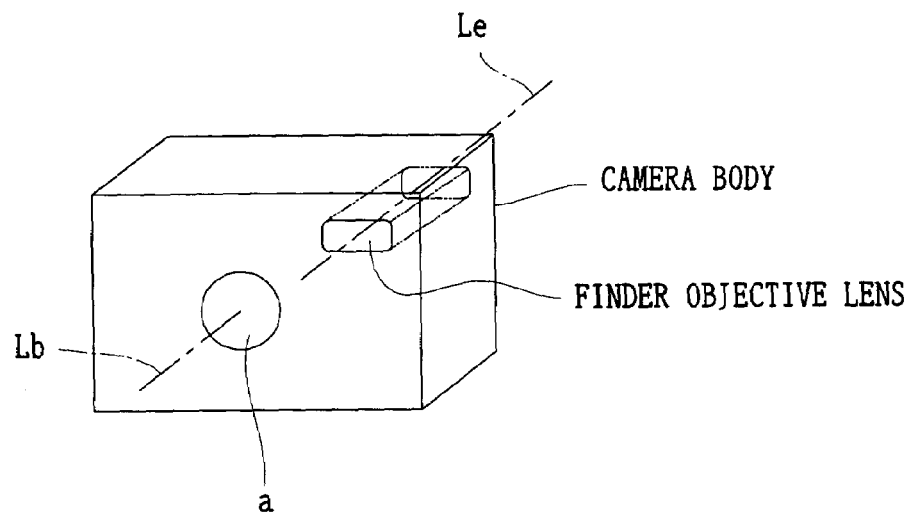
FIG. 9 is a perspective view showing a compact camera that is an example of an imaging apparatus using the variable magnification lens of the present invention.
Figure 10:
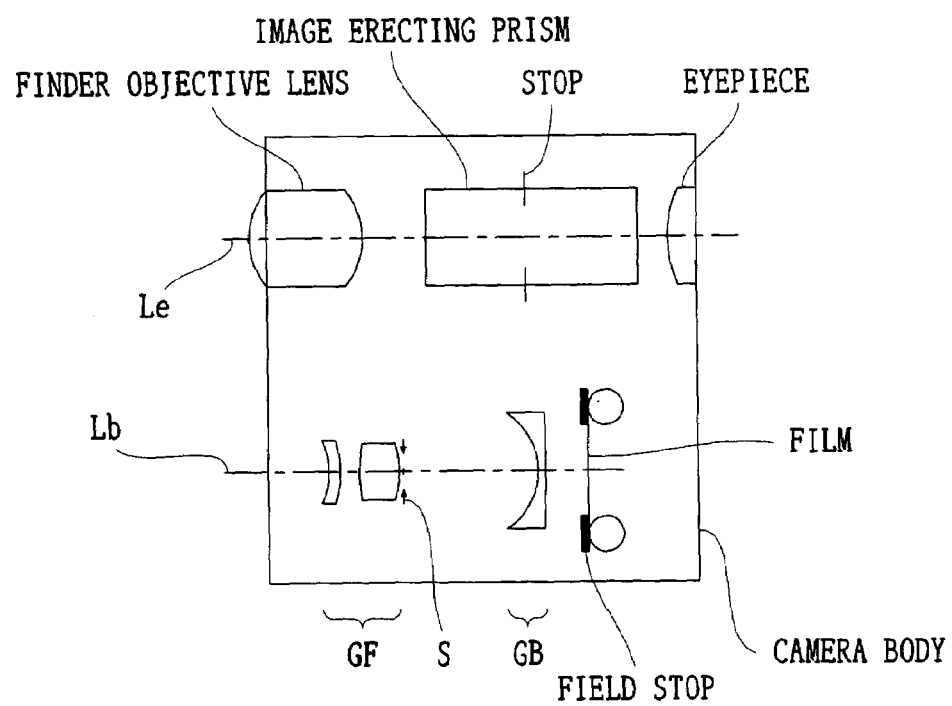
FIG. 10 is a sectional view showing the compact camera of FIG. 9.
Figure 11:
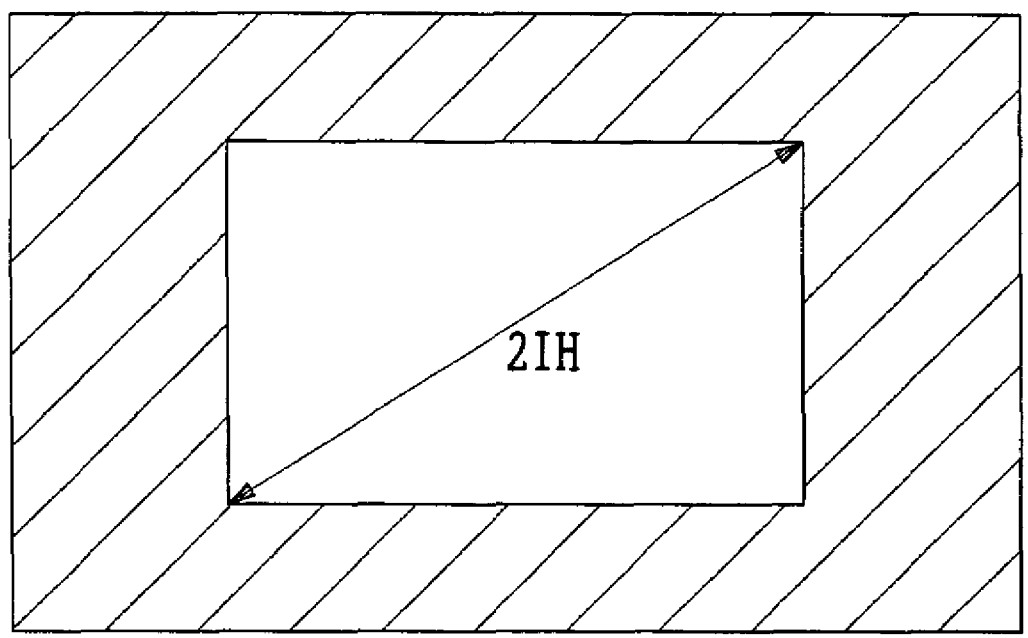
FIG. 11 is an explanatory view showing the diagonal length of the camera of FIG. 10.

The variable magnification lens of the present invention is used as a photographing objective lens a of a compact camera constructed as shown in FIGS. 9 and 10, for instance. In FIG. 9, reference symbol Lb denotes a photographing optical path and Le denotes a finder optical path. The photographing optical path Lb and the finder optical path Le are parallel to each other, and an image of an object is observed through a finder that includes a finder objective lens, an image erecting prism, a stop, and an eyepiece and is formed on a film by the photographing objective lens a. Here, a field stop that has a rectangular aperture limiting a photographing area, such as that shown in FIG. 11, is placed immediately before the film. The diagonal length of the field stop is 2IH.

According to the above embodiments, the variable magnification lens that ensures a moderate variable magnification ratio while keeping down the manufacturing cost and has a positive-negative two-lens-unit arrangement for favorably correcting aberration can be obtained. According to the present invention, an imaging apparatus that is low in cost and has the variable magnification lens bringing about such an effect can be provided.

What is claimed is:

1. A variable magnification lens comprising, in order from an object side:
   a front lens unit with positive refracting power; and
   a rear lens unit with negative refracting power,
   spacing between the front lens unit and the rear lens unit being changed to thereby vary a magnification of the variable magnification lens,
   wherein the front lens unit has a negative single lens element with a concave surface facing the object side at a most object-side position and a positive single lens element at a most image-side position; in the front lens unit, only a second lens element from an image side is provided with at least one aspherical surface; all lens elements included in the front lens unit are constructed as single lens elements arranged through air spacing; an aperture stop is interposed between the front lens unit and the rear lens unit; the rear lens unit is composed of a negative single lens element; and the variable magnification lens satisfies the following condition:

$$1.8 < flt/flw < 3.5$$

where flt is a focal length of an entire system at a telephoto position and flw is a focal length of the entire system at a wide-angle position.

2. A variable magnification lens according to claim 1, further satisfying the following condition:

$$1.9 < flt/flw < 3.0.$$

3. A variable magnification lens according to claim 1, wherein refracting surfaces of the rear lens unit are configured as only spherical surfaces or only a spherical surface and a flat surface.

4. A variable magnification lens according to claim 1, wherein a second lens element from the object side and a lens element placed behind the second lens element satisfy the following condition:

$$50 < vi < 79$$

where vi is an Abbe's number of a material of an ith (i≧2) lens element from the object side.

5. A variable magnification lens according to claim 4, further satisfying the following condition:

$$55 < vi < 72.$$

6. A variable magnification lens according to claim 1, wherein the lens element having the aspherical surface in the front lens unit is constructed of plastic and a remaining lens element in the front lens unit is constructed of glass.

7. A variable magnification lens according to claim 1, wherein the front lens unit is composed of two lens elements: in order from the object side, a lens element with negative refracting power, configured of plastic and having the aspherical surface; and a lens element with positive refracting power, configured of glass.

8. A variable magnification lens according to claim 7, satisfying the following condition:

$$-1.5 < flt/flasn < -0.3$$

where flt is a focal length of an entire system at a telephoto position and flasn is a focal length of the lens element having the aspherical surface in the front lens unit.

9. A variable magnification lens according to claim 8, further satisfying the following condition:

$$-1.2 < flt/flasn < -0.5.$$

10. A variable magnification lens according to claim 1, wherein the front lens unit is composed of three lens elements: in order from the object side, a lens element with negative refracting power, configured of glass; a lens element with positive refracting power, configured of plastic and having the aspherical surface; and a lens element with positive refracting power, configured of glass.

11. A variable magnification lens according to claim 10, satisfying the following condition:

$$0 < flt/flasp < 1.0$$

where flt is a focal length of an entire system at a telephoto position and flasp is the focal length of the lens element having the aspherical surface in the front lens unit.

12. A variable magnification lens according to claim 11, further satisfying the following condition:

$$0.1 < flt/flasp < 0.8.$$

13. An imaging apparatus having a variable magnification lens and an imaging area provided on an image side thereof, the variable magnification lens comprising, in order from an object side:
   a front lens unit with positive refracting power; and
   a rear lens unit with negative refracting power,
   spacing between the front lens unit and the rear lens unit being changed to thereby vary a magnification of the variable magnification lens, wherein the front lens unit has a negative single lens element with a concave surface facing the object side at a most object-side position and a positive single lens element at a most image-side position; in the front lens unit, only a second lens element from an image side is provided with at least one aspherical surface; all lens element included in the front lens unit are constructed as single lens elements arranged through air spacing; an aperture stop is interposed between the front lens unit and the rear lens unit; the rear lens unit is composed of a negative single lens element; and the variable magnification lens satisfies the following condition:

$1.8 < flt/flw < 3.5$ where flt is a focal length of an entire system at a telephoto position and flw is a focal length of the entire system at a wide-angle position.

14. A variable magnification lens according to claim 11, further satisfying the following condition:

$0.13 < flt/flasp < 1.0.$

15. A variable magnification lens according to claim 12, further satisfying the following condition:

$0.13 < flt/flasp < 0.6.$

16. A variable magnification lens according to claim 15, further satisfying the following condition:

$0.3 < flt/flasp < 0.6.$

* * * * *